US012074366B2

(12) United States Patent
Mayer Pujadas et al.

(10) Patent No.: US 12,074,366 B2
(45) Date of Patent: Aug. 27, 2024

(54) RADOME FOR VEHICLES

(71) Applicant: ZANINI AUTO GRUP, S.A., Parets Del Valles (ES)

(72) Inventors: Augusto Mayer Pujadas, Barcelona (ES); Beatriz Bravo García, Barcelona (ES); Vicenç Olivella Blanco, Barcelona (ES)

(73) Assignee: Zanini Auto Grup, S.A., Parets de Valles (ES)

( * ) Notice: Subject to any disclaimer, the term of this patent is extended or adjusted under 35 U.S.C. 154(b) by 101 days.

(21) Appl. No.: 17/716,045

(22) Filed: Apr. 8, 2022

(65) Prior Publication Data

US 2022/0328957 A1 Oct. 13, 2022

(30) Foreign Application Priority Data

Apr. 8, 2021 (EP) .................................... 21382295

(51) Int. Cl.
*H01Q 1/42* (2006.01)
*H01Q 1/02* (2006.01)
*H01Q 1/32* (2006.01)

(52) U.S. Cl.
CPC ................. *H01Q 1/42* (2013.01); *H01Q 1/02* (2013.01); *H01Q 1/3275* (2013.01)

(58) Field of Classification Search
CPC ............ H01Q 1/02; H01Q 1/42; H01Q 1/421; H01Q 1/422; H01Q 1/424; H01Q 1/425; H01Q 1/427; H01Q 1/428
See application file for complete search history.

(56) References Cited

U.S. PATENT DOCUMENTS

2002/0044101 A1* 4/2002 Zimmermann .......... H01Q 1/02 343/872
2019/0232886 A1* 8/2019 Okumura ................. H01Q 1/42
2020/0110155 A1* 4/2020 Cho ......................... G01S 7/027
2020/0340660 A1 10/2020 Van Straten
2022/0163632 A1* 5/2022 Kobayashi .............. B60R 11/02

FOREIGN PATENT DOCUMENTS

DE 102015004204 A1 8/2015
EP 3514567 A1 7/2019
EP 3648248 A1 5/2020
JP 2019168265 A 10/2019
WO 2019065165 A1 4/2019

OTHER PUBLICATIONS

European search report for EP21382295.0, dated Aug. 25, 2021, 3 pages.

* cited by examiner

*Primary Examiner* — Daniel Munoz
(74) *Attorney, Agent, or Firm* — Danielson Legal LLC

(57) ABSTRACT

The radome (1) for vehicles comprises a decoration layer (17), a transparent front layer (19), and a heater (15) that heats the transparent front layer (19), wherein the radome (1) also comprises a thermal control (11) and a switch (13), so that the switch (13) switches on or switches off the heater (15) according to the temperature detected by the thermal control (11).

It permits to provide a radome for vehicles that offers a degree of autonomy in the management of the heating without the need of external actions, optimizing the process of removing the ice or snow while maintaining the integrity of the radome.

13 Claims, 10 Drawing Sheets

RADOME FOR VEHICLES

CROSS-REFERENCE TO RELATED APPLICATIONS

The present application claims the benefit of and priority to European Patent Application No. 21382295.0, filed on Apr. 8, 2021, the entire disclosure of which is incorporated by reference as if set forth in its entirety herein.

The present invention refers to a radome for vehicles, comprising an autonomous thermal control and switch.

BACKGROUND OF THE INVENTION

The continuing evolution of automotive technology aims to deliver Automated Driving Systems (ADS) through increasing levels of driver assistance defined by the Society Automotive Engineers (SAE) in the coming years.

Vehicles with sensors able to sense their surroundings are the key enablers to decrease road fatalities. Through sensors, driver assistance functions are implemented, minimizing risks, and increasing the probability of avoiding collisions.

Vehicles are designed to offer an aesthetically pleasant impression. Therefore, sensors must be integrated within the vehicle behind covers enabling their function, concealing them from the public view and harmonized with the aesthetic design of the vehicle.

In case of a radar sensor, such covers are known as radomes. They usually represent the car manufacturer's emblem and must minimize the impact its presence offers to radar emitted and received waves. Their function is especially important in adverse weather conditions, when driving becomes more dangerous due to loss of visibility, road ground conditions and other. Obviously, water, ice and snow represent a clear danger for the functionality of the radar, as they block radar waves and can be deposited over the radome surface.

Hence, radomes must be able to remove such layers, for instance, melting them. In this case, the radome includes some heating resistance in the form of conductive wires which are heated by electricity provided by a power source. They heat the surrounding material until the outer front surface reaches a temperature able to melt the ice or snow and remove the resulting water from it.

Although the target may be to achieve a given temperature of the outer front surface of the radome specified by the automobile manufacturer and to reduce as much as possible the time required to melt the ice or snow, it may happen that some other area of the radome is damaged because the achieved temperature is higher than the maximum acceptable by the plastic material. This may degrade the radiofrequency performance and, consequently, the safety associated to the radar's function.

An optimized thermal design would lead to position the heater at the outer front surface of the radome. However, this may be incompatible with the high aesthetical requirements for the radomes, which represent the manufacturer's emblem. In these cases, the heater is usually positioned in internal layers of the radome. These designs increase the temperature that internal plastic layers may suffer to achieve the specified external surface temperature being, potentially, in conflict with what these materials can withstand.

US 2019232886 A1 discloses a radome which considers the existence of a thermistor in the electrical path of the heating circuit. However, as it describes, it requires a connection to an external electronic controller apart of the radome.

EP 3648248 A1, of the same applicant than the present application, also discloses a radome for vehicles comprising a temperature sensor. However, it requires an additional external communication to the power source in order to modulate the supplied energy.

JP 2019168265 A discloses a decorative part with a thermostat used as an overheating prevention element able of cutting off the power. However, it does not provide the system to autonomously switching on the heating when a safe temperature is achieved again, optimizing the heating function. It acts as a safety function, but its own heat dissipation does not have the capability to switch on by itself to operate as a regulation device.

There is a trend in automotive industry to include more sensors in the different devices of the vehicle. It is expected that these sensors are not only able to communicate the device state to the Electronic Control Unit (ECU) of the vehicle but also to ensure the integrity of the device by itself and optimize its function within the vehicle. The diversity of operational conditions that the radome may suffer in real life (external temperature, vehicle speed or existence of an air chamber between the radome and the ice layer, also known as "igloo effect") may not allow to predict the optimal power to be delivered to the heating to remove the ice or snow without putting in risk the integrity of the radome.

DESCRIPTION OF THE INVENTION

Therefore, one purpose of the present invention is to provide a radome for vehicles that offers a degree of autonomy in the management of the heating without the need of external actions, optimizing the process of removing the ice or snow while maintaining the integrity of the radome.

With the radome for vehicles according to the present invention it is possible to solve said drawbacks, providing other advantages that are described below.

The radome for vehicles according to the present invention comprises:

- a decoration layer;
- a front layer; and
- a heater that heats the front layer, wherein the radome also comprises a thermal control and a switch, so that the switch switches on or switches off the heater according to the temperature detected by the thermal control.

According to a preferred embodiment, the thermal control is a thermistor, and the heater is a heater layer.

Advantageously, the thermal control is connected in series with two resistances.

Furthermore, the thermal control and the resistances are connected in parallel with respect to the switch and the heater.

Furthermore, the thermal control and the switch are preferably mounted on a printed circuit board, and a cover separates the thermal control and the switch from the heater.

An intermediate layer is preferably placed between the decoration layer and the heater.

The radome according to the present invention also comprises a rear layer, including preferably a connector housing that houses an input contact for connecting the heater.

Advantageously, the thermal control, the switch, the cover and/or the connector housing are placed in a thermal control and switch area that is placed outside a field of view area of the radome.

According to an embodiment, the radome comprises connecting walls defining a chamber, and the connecting walls are advantageously placed outside the field of view area. Thermal control is advantageously placed in said chamber.

Furthermore, the heater can also comprise conductive heating wires, and the conductive heating wires are preferably positioned adjacent to the thermal control.

According to an embodiment, conductive pads are located on a face of the printed circuit board close to the heater layer, and the conductive pads are electrically connected to the heating wires.

The combination of a thermal control activating an independent switch, both inside the radome, allows the interruption of the electrical power without external action from, for instance, the Electronic Control Unit (ECU) of the vehicle when a maximum temperature of the radome might damage its physical integrity.

The combination of a thermal control activating an independent switch, both inside the radome, allows to switch on again the heating when the highest temperature of the radome is reduced to a safe working temperature for the materials of the radome.

The selection of values of the variable resistance of the thermal control and fixed resistances allows to define the range of temperatures at which the radome will operate as a regulation device, providing the maximum effectiveness to the heating function, reducing the time to remove the ice or snow, without compromising the radome physical integrity.

Eliminates the need of a pre-defined Pulse Width Modulation (PWM) function at the Electronic Control Unit (ECU) to manage the power delivered to the heating of the radome as a function of external factors.

The distant positioning of the thermal control respect to other components allows to locate it where it can be affected by the existence of a thermally isolated radome/radar chamber, if exits, while keeping the external access to the connector housing.

The adaptation of the routing of the heating wires in the proximity of the thermal control allows to ensure the detection of the maximum temperature at the radome.

BRIEF DESCRIPTION OF THE DRAWINGS

For a better understanding the above explanation and for the sole purpose of providing an example, some non-limiting drawings are included that schematically depict a practical embodiment.

DESCRIPTION OF PREFERRED EMBODIMENTS

Figure 1:
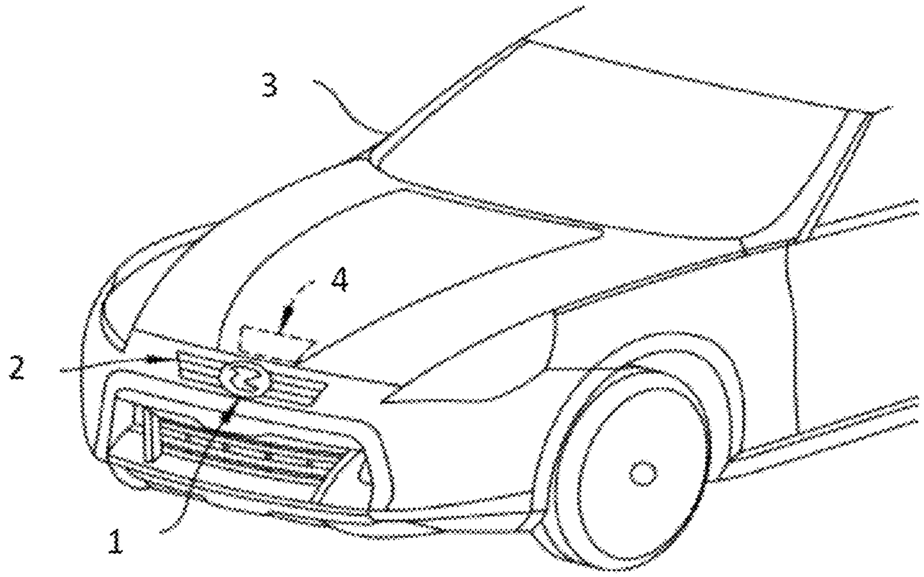
FIG. 1 is a fragmentary isometric view of a vehicle having a radome constructed in accordance with and embodying the invention positioned within a grill assembly and a radar antenna positioned behind the radome.

With reference now in detail to the drawings, wherein like numerals will be employed to denote like components throughout, as illustrated in FIG. 1, the reference numeral 1 denotes generally a decorative radome constructed in accordance with and embodying the invention configured for mounting within a grill assembly 2 of a motor vehicle 3.

Positioned within the vehicle 3 behind and in registration with the decorative radome 1 is a radar antenna 4.

Figure 2:
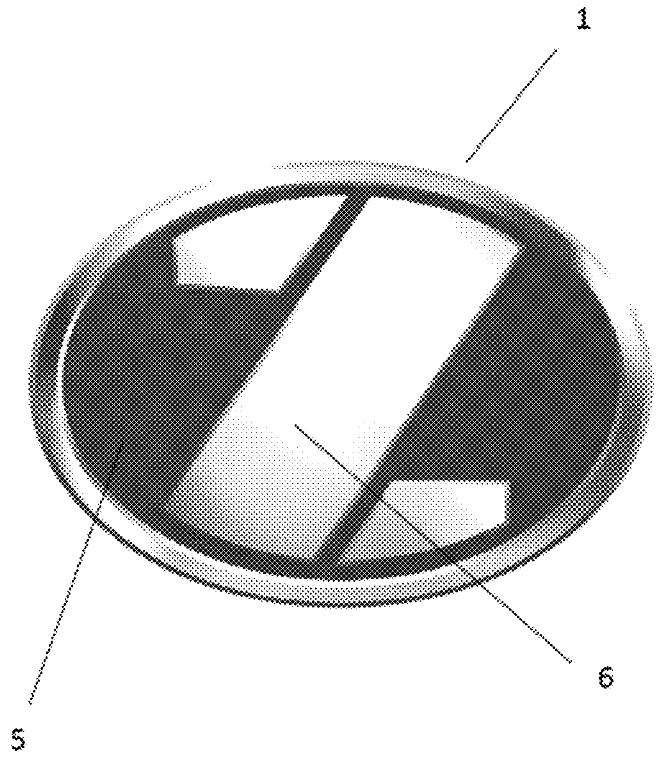
FIG. 2 is a front view of the radome, where a manufacturer's emblem may be identified by contrast of colored and bright areas.

FIG. 2 shows a front view of the radome 1, where it is visible a radio transmissive colored area 5 and a bright decoration area 6 that provides the metal looking appearance while keeping high transmittance performance for the signal emitted and received by the protected radar antenna 4.

Figure 3:
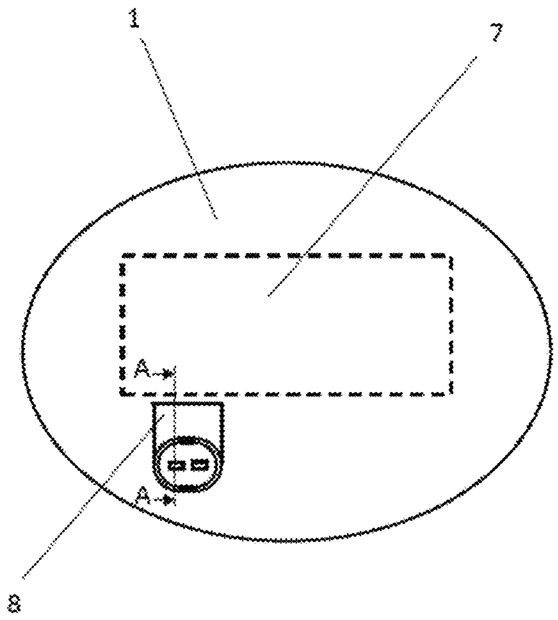
FIG. 3 is a rear view of a radome with autonomous thermal control and switch.

FIG. 3 shows the radome 1 from its rear side. Numeral reference 7 represents a field of view area limited by the discontinuous lines. The transmission performances required by the radar antenna 4 must be provided within this area of the radome 1.

Out of this area, the radome 1 does not have these strict transmission requirements and may include other elements that would affect to the transmission if included in the field of view area 7. Numeral reference 8 represents the area where the autonomous thermal control and switch and the connector are located. They will be described later.

Figure 4:
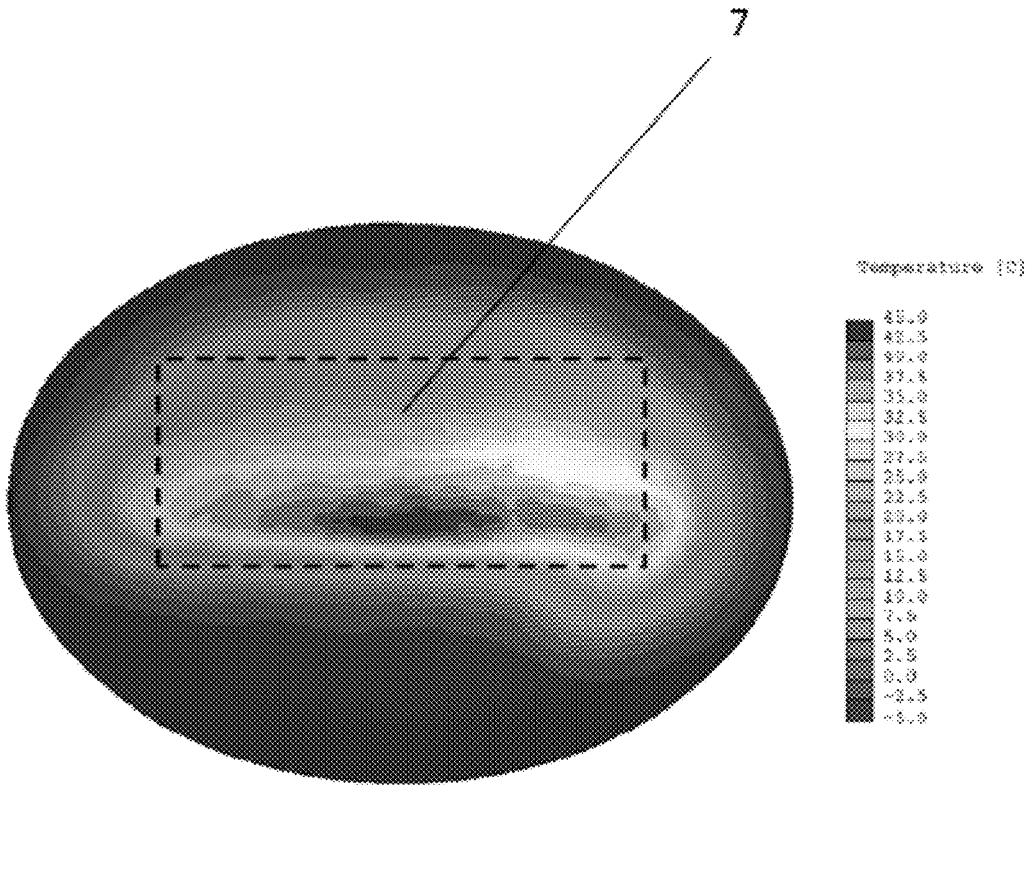
FIG. 4 is a thermal map of the heated radome.

A thermal map of the heated radome is shown on FIG. 4. It corresponds to a given vehicle speed and external ambient temperature and is represented at a given depth of the radome. As it may be seen, the temperature is not uniformly distributed, and it is easy to understand how difficult it is to be established in advance.

Figure 5:
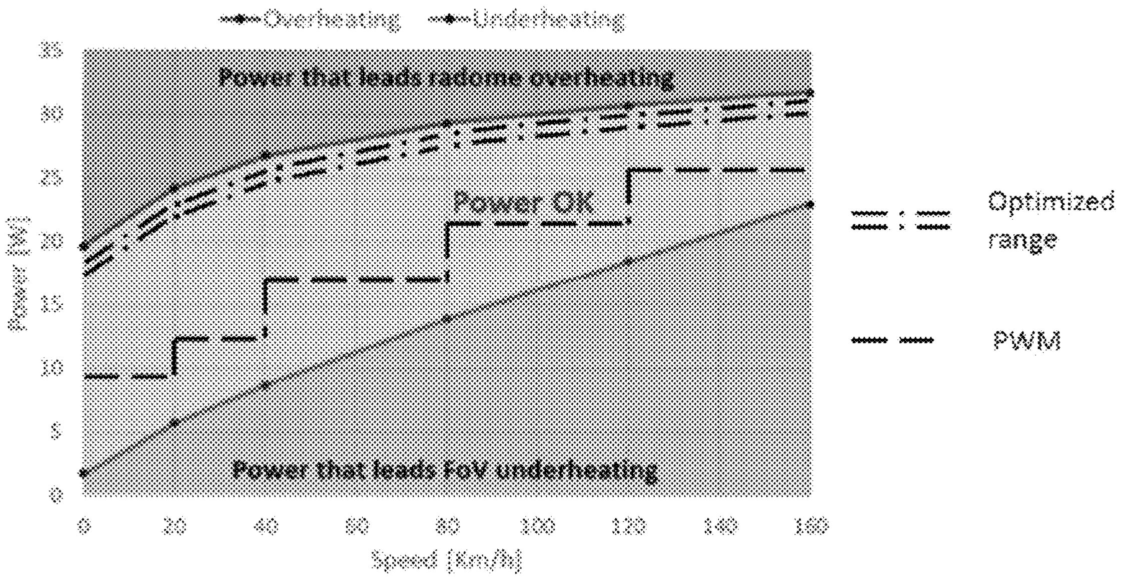
FIG. 5 is a graph of powers delivered to the heating wires.

FIG. 5 shows that, at a given external temperature, there is, at each vehicle speed, a range of acceptable power to be delivered to the heating wires. The minimum value ensures that all the surface points of field of view area 7 reach a temperature enough to melt the ice or snow and the maximum power ensures the absence of overheating at any radome position.

At current heated radome systems, the power delivered to the heating wires is managed by a pre-defined Pulse Width Modulation (PWM) function at the Electronic Control Unit (ECU), as represented by the PWM line on FIG. 5. The delivered power does not minimize the melting time to be safe in front of an unpredicted occasional overheating. The concept here disclosed allows to deliver a power within the Optimized range on FIG. 5.

The Electronic Control Unit (ECU) may deliver the maximum power (for instance, 35 W according to FIG. 5)

and the system interrupts the power delivery at a defined point just below the overheating situation. As soon as the temperature decreases, it delivers power again to the heating wires, keeping the delivered power within the Optimized range. This avoids the need of a pre-defined PWM and reduces the melting time while assuring the radome integrity in an autonomous way without the need of external actions.

Figure 6:
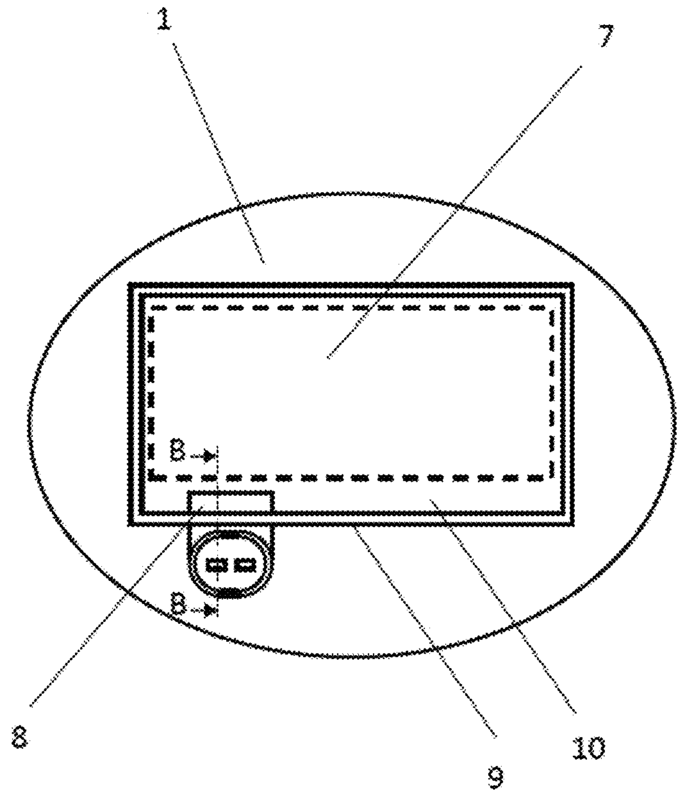
FIG. 6 is a rear view of a radome with autonomous thermal control and switch, showing a radome/radar chamber.

FIG. 6 shows a mounting option of the radar and the radome, which includes connecting walls 9 from the radome 1 to the radar antenna 4 (not shown in FIG. 6). They may be an independent part or being an integral part of the radome.

The connecting walls 9 are located outside of the field of view area and, with the rear surface of the radome 1 and the front surface of the antenna radar 4, define a radome/radar chamber 10. This radome/radar chamber 10 may be sealed respect to the outside environment or some discontinuities may be present allowing some level of ventilation. The thermal control 11 is preferably placed in said chamber 10.

Figure 7:
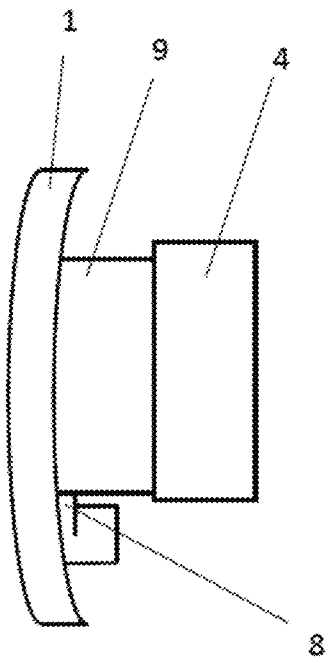
FIG. 7 is a side view of a radome with autonomous thermal control and switch where connecting walls and radar antenna are shown.

There may be some additional elements like gaskets (not shown) to improve the connection between the radome 1 and the radar 4 through the connecting walls 9. This same configuration may be seen on the side view represented on FIG. 7, where it may be appreciated the connection between radome 1 and radar antenna 4 through the connecting walls 9.

Figure 8:
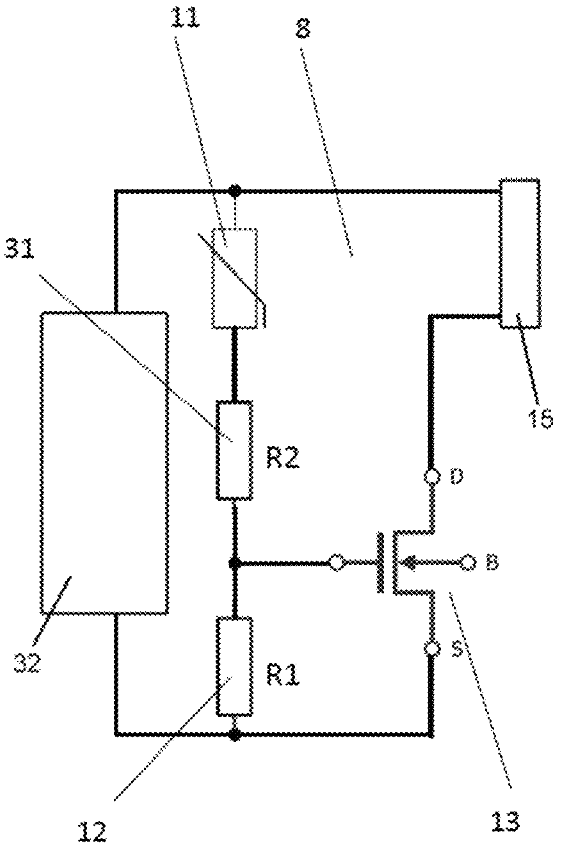
FIG. 8 is a simplified electrical scheme of an autonomous thermal control and switch.

A simplified electrical scheme of the autonomous thermal control and switch 8 is shown in FIG. 8. It is electrically located between a power source 32, usually external to the radome, and a heater 15, located at the radome.

It contains a switch 13 connected in series between the power source 32 and the heater 15 and has the capability to switch off and switch on the power delivered to the heater 15. The switch 13, as represented, may take the form of a MOSFET component.

The thermal control 11 and resistances 12 and 31 are connected in series between them and in parallel respect to the switch 13 and the heater 15. The thermal control 11, as represented, may take the form of a thermistor, either as a PTC or an NTC component. Depending on if a PTC or an NTC is selected and the polarity of the power source 32, the relative electrical position of the thermal control 11 and the resistances 12 and 31 with respect to the switch 13 will be defined.

The thermal control 11 has the property of varying its internal resistance as a function of the temperature it perceives in its surrounding. When the Electronic Control Unit (ECU) of the vehicle (not shown) detects some specified cold external temperature conditions, it gives the power source 32 the command to deliver electrical power to the radome 1. This activates the heater 15 of the radome 1, transferring heat to its front surface 19 and melting down the layer of ice or snow that may be deposited on it.

If the temperature detected by the thermal control 11 surpasses its switch-off threshold level, its variable resistance changes enough that, combined with the values of the resistances 12 and 31, acts on the switch 13, cutting off the power delivered to the heater 15. Therefore, the radome 1 starts to cool down because of the combined action of low external temperature and vehicle speed.

When the temperature detected by the thermal control 11 falls below its switch-on threshold level, its variable resistance changes enough that, combined with the values of the resistances 12 and 31, acts on the switch 13, allowing the power source 32 to energize the heater 15 again.

Combining a correct location of the thermal control 11 to detect the highest temperature of the radome (or one with a close correlation to it) and a switch-off threshold level below the maximum acceptable temperature of the materials used in the radome 1, ensures the integrity of the radome independently of the remote Electronic Control Unit (ECU).

At the same time, it autonomously restarts the heating function as soon as it is safe for the radome integrity. This allows the heater 15 to work within an optimized range of temperatures shown on FIG. 5 that provides the maximum energy to remove the ice or snow, reducing the melting time, without putting at risk the radome integrity.

Figure 9:
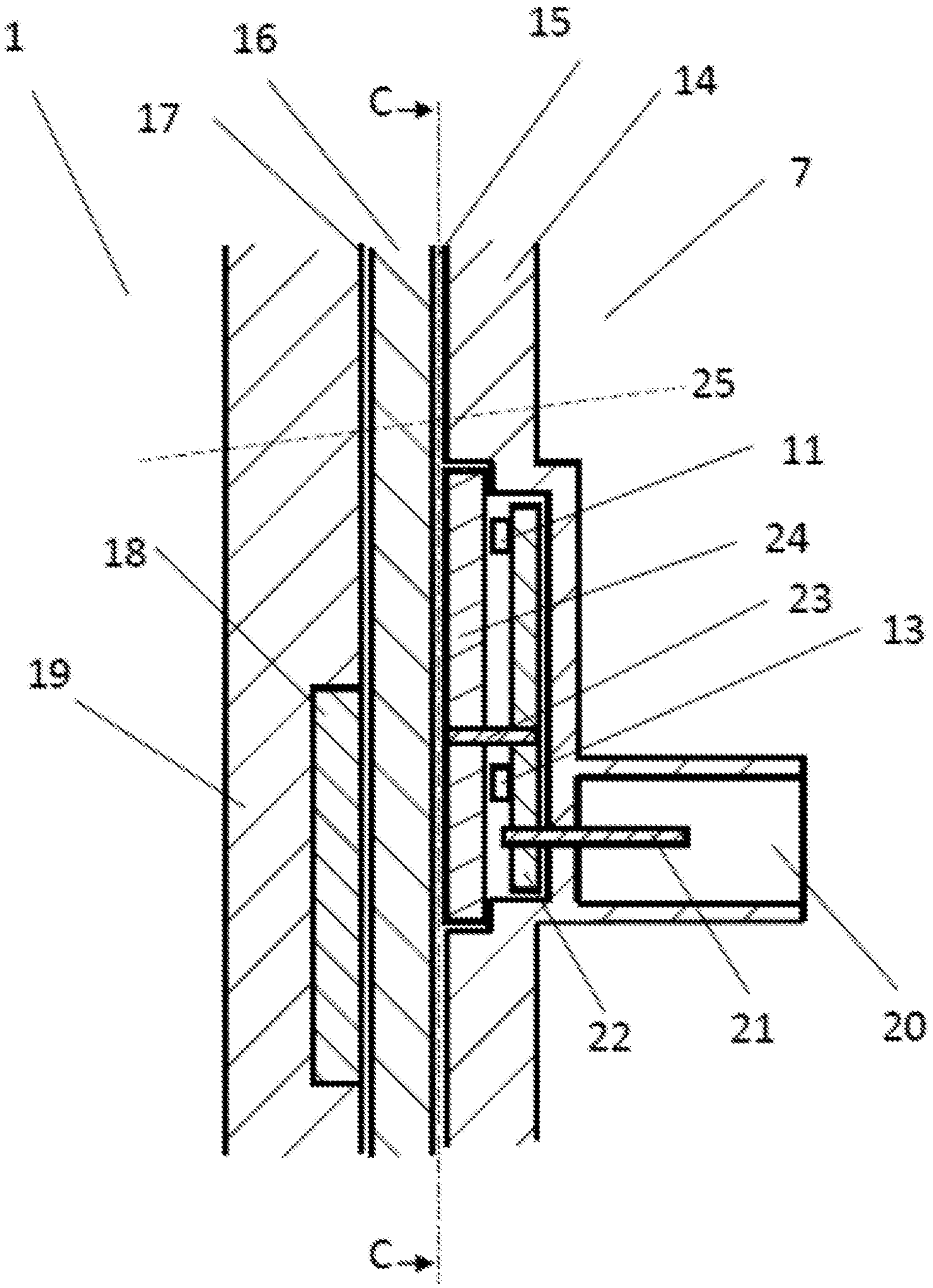
FIG. 9 is a cross section of the radome along A-A of FIG. 3 corresponding to a first embodiment.

The cross-section of FIG. 9 shows the general configuration of the heated radome 1 from its rear to front surfaces. It starts with a rear layer 14, manufactured by an injection molding process of a material such as Acrylonitrile butadiene styrene (ABS) or a blend of Polycarbonate and Acrylonitrile butadiene styrene (PC/ABS). The heater 15, which in this embodiment is made as a layer, is positioned just in front of it. It may consist of conductive heating wires 29 (not shown in this figure but shown in FIGS. 14 and 15) positioned on the internal face of the rear layer 14 or it may be a plastic layer which contains the conductive heating wires 29 and positioned on the internal face of the rear layer 14.

Just in front of it, an intermediate layer 16 is positioned. It consists of a thermoplastic material as, for example, Acrylonitrile butadiene styrene (ABS) or a blend of Polycarbonate and Acrylonitrile butadiene styrene (PC/ABS). It is obtained by an injection molding process and its function is to avoid that a decoration layer 17, located on its front side, might be damaged by a direct contact with the heater layer 15.

Decoration layer 17 provides the usual metal looking appearance of the bright decoration area 6 of FIG. 2 and, optionally, the colored appearance of the radio transmissive colored area 5 shown in FIG. 2. Alternatively, the radio transmissive colored area 5 of FIG. 2 may be provided by a discontinuous colored front layer 18. It is obtained by an injection molding process of a material such as Polycarbonate (PC).

A transparent front layer 19 is also obtained by an injection molding process of a material such as Polycarbonate (PC). Addition layers of materials like varnishes may be present to protect the components from external actions or of possible damage during the manufacturing process. All the materials selection and thicknesses are carefully chosen to provide an optimized transmission of waves from or to the radome.

The described configuration contains the heater layer 15 at some internal position of the radome. Some radomes have it on the outer front surface. This is more efficient from the energy point of view, but it may damage the appearance perceived by an external observer which may be able to see the heating wires. The configuration described herein provides a better appearance although it may be more demanding for the plastic parts, which may be forced to withstand higher temperatures.

Embodiment 1

In the following, a first embodiment of the radome 1 thermally managed by an autonomous thermal control and switch system that does not require the remote control of the vehicle's Electronic Control Unit (ECU) is described with reference to FIG. 9.

A connector housing 20 provides a mechanical interface to an aerial connector which supplies the electrical power. The power source 32 is electrically connected to input contacts 21, which are connected to a printed circuit board (PCB) 22. It is represented here as a rigid PCB, but it may be in a flexible or rigid-flexible configuration. These last ones may allow a better adaptation to the usual curved cap shape of the radomes.

The PCB 22 contains the thermal control 11, the switch 13 and the resistances 12, 31 (not shown in FIG. 9) electrically connected between them and to the input contacts 21 and to heater contacts 23 according to the electrical scheme represented at FIG. 8. The heater contacts 23 are electrically connected to heating wires 29 (not shown in FIG. 9 but shown in FIG. 14) of the heater layer 15.

The closure of the autonomous thermal control and switch system is done by a cover 24, which is made, for instance, of a thermoplastic material and provides protection to the electronic components from being in direct contact with the heater layer 15.

As it may be seen, the thermal control 11 is very close to the heater layer 15 and surrounded by the rear layer 14. This allows the thermal control 11 to capture the highest temperature because the generation of heat is performed at the heater layer 15 and together with the rear layer 14, both are located far from the cooling that takes place through the transparent front layer 19 because of the action of the external low temperature and vehicle speed.

Some thermal conductive potting or silicone (not shown) may be used around the thermal control 11 to improve the thermal connection with the plastic walls around it. On the other side, the whole autonomous thermal control and switch system is located out of the field of view 7 limited by the dashed line 25, not affecting to the transmission capabilities or the radome 1.

It may be seen that the thermal control 11 is located at a significant distance from other electronic components like the switch 13 in order to keep it isolated from thermal influence from such components.

Embodiment 2

Figure 10:
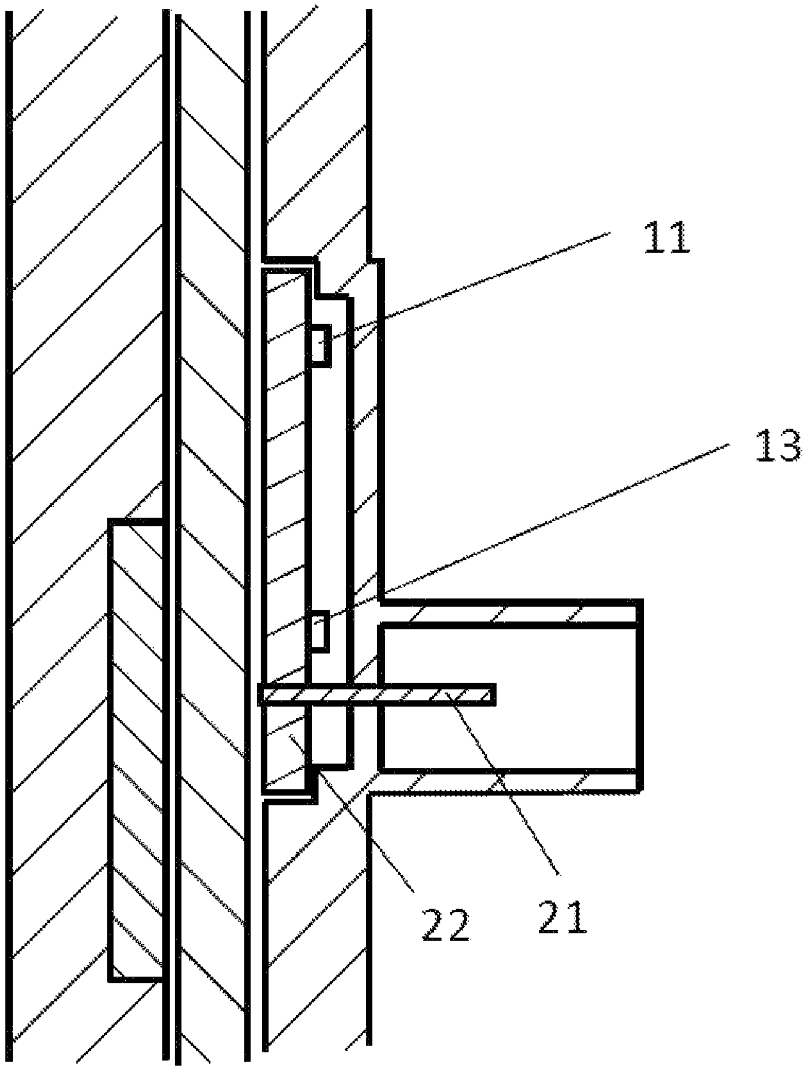
FIG. 10 is a cross section of the radome along A-A of FIG. 3 corresponding to a second embodiment.

In the following, a second embodiment is described with reference to FIG. 10. In the second embodiment, identical reference numerals are given to the components that are quite similar to the corresponding components of the first embodiment and redundant description is omitted therein.

The second embodiment of the autonomous thermal control and switch system also has the power source 32 electrically connected to the input contacts 21, which are connected to the printed circuit board (PCB) 22. The PCB 22 contains the thermal control 11, switch 13 and resistances 12, 31 (not shown in FIG. 10) electrically connected between them and to the input contacts 21 and to conductive pads 30 (not shown in FIG. 10 but shown in FIGS. 14 and 15) according to the electrical scheme represented at FIG. 8.

The conductive pads 30 are located on the PCB face close to the heater layer 15 and electrically connected to the heating wires 29 of the heater layer 15. The closure of the autonomous thermal control and switch system is done by the PCB 22 by itself, providing protection to the electronic components, which are located on the opposite PCB face from being in direct contact with the heater layer 15.

This second embodiment also positions the thermal control 11 very close to the heater layer 15 and surrounded by the rear layer 14. Same considerations regarding the capture of the highest temperature and lack of influence on transmission capabilities of radome may be done as on first embodiment. Some thermal conductive potting or silicone (not shown) may be used around the thermal control 11 to improve the thermal connection with the plastic walls around it. Additionally, a lower profile of the system is achieved.

Embodiment 3

Figure 11:
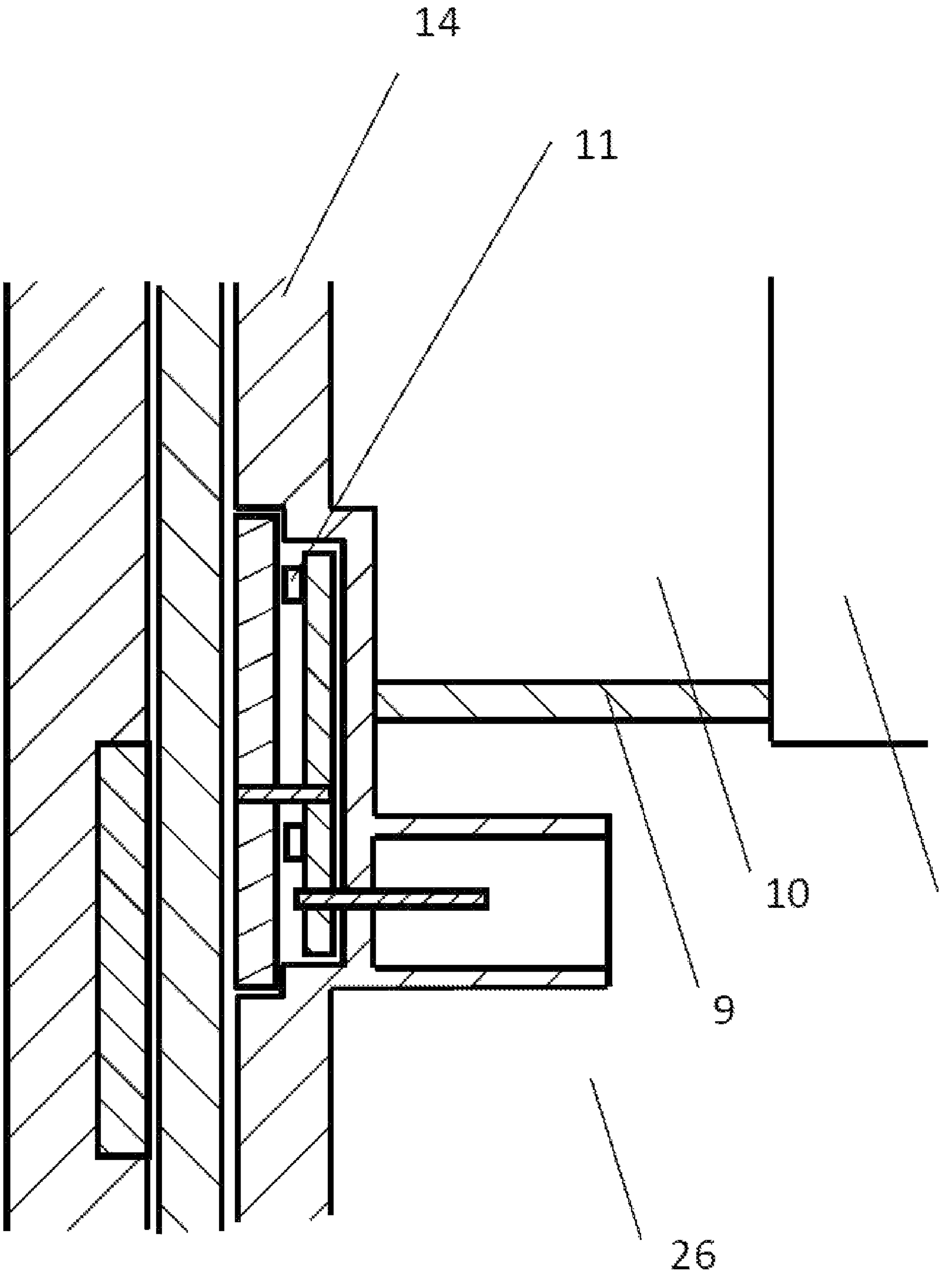
FIG. 11 is a cross section of the radome along B-B of FIG. 6 corresponding to a third embodiment.

In the following, a third embodiment is described with reference to FIG. 11. In the third embodiment, identical reference numerals are given to the components that are quite similar to the corresponding components of the first embodiment and redundant description is omitted therein.

The third embodiment of the autonomous thermal control and switch system corresponds to a mounting option of the radar and the radome, which includes connecting walls 9 that connect partially or totally the radome 1 to the radar antenna 4. The connecting walls 9 together with the rear surface of the radome 1 and the front surface of the antenna radar 4, define a radome/radar chamber 10.

The radome/radar chamber 10 is partially thermally isolated from the external environment 26, which will be colder that the radome/radar chamber 10 when the heater layer 15 is switched on. The radome/radar chamber 10 receives the heating from the heater layer 15 through the rear layer 14 and some heating generated by the radar antenna 4 may also be present.

The design of the autonomous thermal control and switch system is similar to the first embodiment adding the fact that the part of the rear layer 14 that is closest to the thermal control 11 is one of limiting walls of the radome/radar chamber 10. This allows the thermal control 11 to detect the highest temperature of the radome (or one with a close correlation to it), caused by inner heating elements like the heater layer 15 and outer heating elements like the radar antenna 4.

At the same time, the connector housing 20 remains located outside of the radome/radar chamber 10, allowing its access at any time to connect or disconnect the aerial connector of the power source.

Embodiment 4

In the following, a fourth embodiment is described with reference to FIG. 10 and FIG. 11. In the fourth embodiment, identical reference numerals are given to the components that are quite similar to the corresponding components of the second and third embodiments, which are combined, and redundant description is omitted therein.

The closure of the autonomous thermal control and switch system is done by the PCB 22 as in second embodiment and the radome includes connecting walls 9 and the part of the rear layer 14 that is closest to the thermal control 11 is one of limiting walls of the radome/radar chamber 10 as in third embodiment. The same arguments of detecting the highest temperature of the radome influenced by the radome/radar chamber 10 of third embodiment also applies.

At the same time, the connector housing 20 remains located outside of the radome/radar chamber 10, allowing its access at any time to connect or disconnect the aerial connector of the power source.

Embodiment 5

In the following, a fifth embodiment is described with reference to FIG. 9 and FIG. 12. In the fifth embodiment, identical reference numerals are given to the components that are quite similar to the corresponding components of the first embodiment and redundant description is omitted therein.

Figure 12:
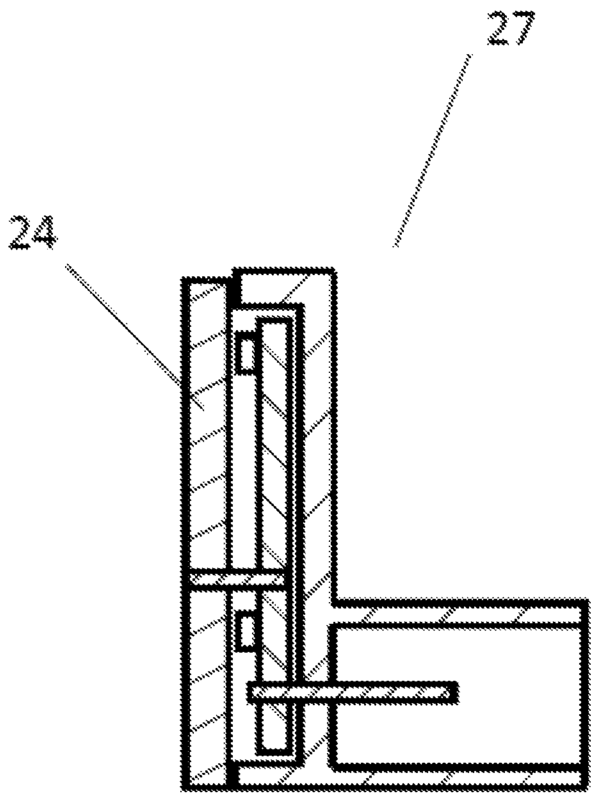
FIG. 12 shows a cross section of the autonomous thermal control and switch as an independent unit corresponding to a fifth embodiment.

FIG. 12 shows the autonomous thermal control and switch system as a plastic-covered independent component 27 which has the same components as described on first embodiment, including the cover 24. This plastic-covered independent component 27 may be insert molded with rear layer 14 during its manufacturing process, maintaining the same position as described in the first embodiment.

Embodiment 6

In the following, a sixth embodiment is described with reference to FIG. 10 and FIG. 13. In the sixth embodiment, identical reference numerals are given to the components that are quite similar to the corresponding components of the second embodiment and redundant description is omitted therein.

Figure 13:
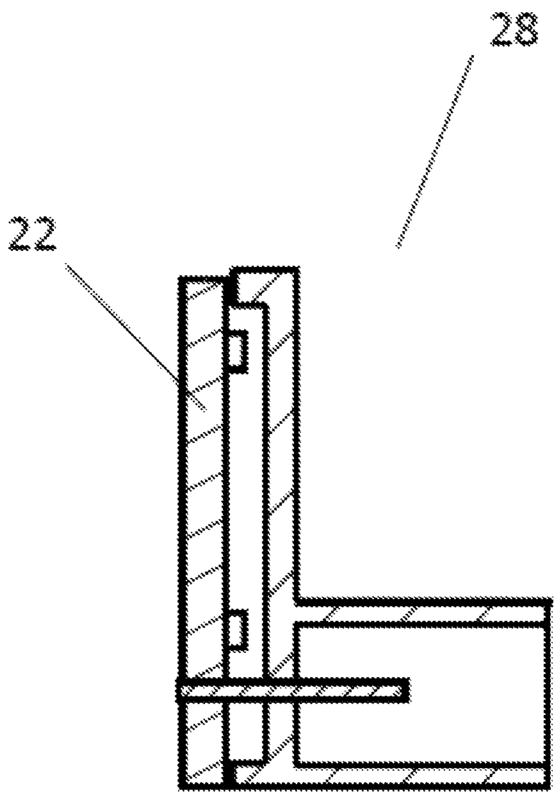
FIG. 13 shows a cross section of another autonomous thermal control and switch as an independent unit corresponding to a sixth embodiment.

FIG. 13 shows the autonomous thermal control and switch system as a PCB-covered independent component 28 which has the same components as described on second embodiment, including the covering PCB 22. This PCB-covered independent component 28 may be insert molded with rear layer 14 during its manufacturing process, maintaining the same position as describe in second embodiment.

Embodiment 7

In the following, a seventh embodiment is described with reference to FIG. 11 and FIG. 12. In the seventh embodiment, identical reference numerals are given to the components that are quite similar to the corresponding components of the third embodiment and redundant description is omitted therein.

FIG. 12 shows the autonomous thermal control and switch system as a plastic-covered independent component 27 which has the same components as described on first embodiment, including the cover 24. This plastic-covered independent component 27 may be insert molded with rear layer 14 during its manufacturing process, maintaining the same position as describe in third embodiment.

The same arguments of detecting the highest temperature of the radome influenced by the radome/radar chamber 10 of third embodiment also applies.

Embodiment 8

In the following, an eighth embodiment is described with reference to FIG. 11 and FIG. 13. In the seventh embodiment, identical reference numerals are given to the components that are quite similar to the corresponding components of the fourth embodiment and redundant description is omitted therein.

FIG. 13 shows the autonomous thermal control and switch system as a PCB-covered independent component 28 which has the same components as described on second embodiment, including the covering PCB 22. This PCB-covered independent component 28 may be insert molded with rear layer 14 during its manufacturing process, maintaining the same position as describe in fourth embodiment.

The same arguments of detecting the highest temperature of the radome influenced by the radome/radar chamber 10 of third embodiment also applies.

The distance between the heating wires 29 within the field of view area 7 must respect a minimum value to ensure a good transmission of the radar waves directed from or to the radar antenna. However, all the above-mentioned embodiments may benefit of higher freedom of heating wires routing in the vicinities of the thermal control 11 because it is located outside of the field of view area 7.

Figure 14:
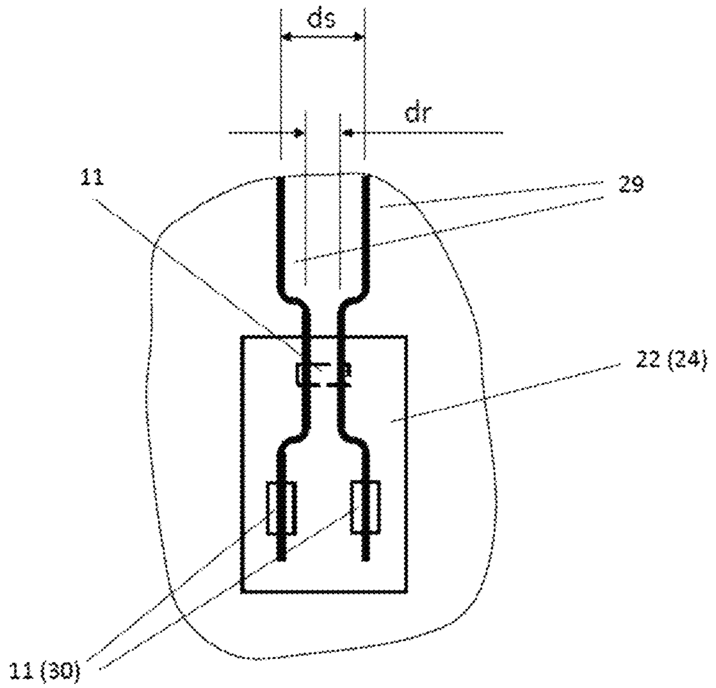
FIG. 14 shows a detail of the heating wires routing in the proximity of the thermal control seen according to C-C in FIG. 9.

As represented in FIG. 14, a standard distance ds between heating wires 29 of the heater layer 15 may be modified to a reduced distance dr in the proximity of the thermal control 11. This ensures the thermal control 11 can capture the temperature of the hottest spot (or close to the temperature of the hottest spot) of the radome providing higher protection to the radome integrity.

Figure 15:
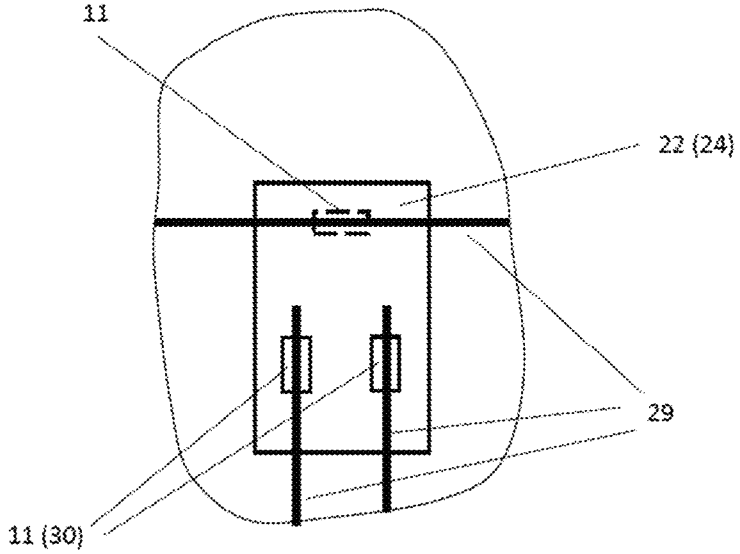
FIG. 15 shows a detail of an alternative heating wires routing in the proximity of the thermal control seen according to C-C in FIG. 9.

An alternative way to maximize the temperature detected by the thermal control 11 is to intentionally route one heating wire 29 above it, as shown on FIG. 15.

Even though reference has been made to a specific embodiment of the invention, it is obvious for a person skilled in the art that the radome for vehicles described herein is susceptible to numerous variations and modifications, and that all of the details mentioned can be substituted for other technically equivalent ones without departing from the scope of protection defined by the attached claims.

The invention claimed is:

1. Radome (1) for vehicles, comprising:

a decoration layer (17);

a transparent front layer (19); and a heater (15) that heats the transparent front layer (19), characterized in that the radome (1) also comprises a thermal control (11) and a switch (13), so that the switch (13) switches on or switches off the heater (15) according to the temperature detected by the thermal control (11)

wherein the thermal control (11) is connected in series with two resistances (12, 31), and the thermal control (11) and the resistances (12, 31) are connected in parallel with respect to the switch (13) and the heater (15).

2. Radome (1) for vehicles according to claim 1, wherein the thermal control (11) is a thermistor.

3. Radome (1) for vehicles according to claim 1, wherein the heater (15) is a heater layer.

4. Radome (1) for vehicles according to claim 1, wherein the thermal control (11) and the switch (13) are mounted on a printed circuit board (22).

5. Radome (1) for vehicles according to claim 4, wherein conductive pads (30) are located on a face of the printed circuit board (22) close to the heater layer (15), and the conductive pads (30) are electrically connected to the heating wires (29).

6. Radome (1) for vehicles according to claim 1, wherein a cover (24) separates the thermal control (11) and the switch (13) from the heater (15).

7. Radome (1) for vehicles according to claim 6, wherein the thermal control (11), the switch (13), the cover (24) and/or the connector housing (20) are placed in a thermal control and switch area (8) that is placed outside a field of view area (7) of the radome (1).

8. Radome (1) for vehicles according to claim 1, wherein an intermediate layer (16) is placed between the decoration layer (17) and the heater (15).

9. Radome (1) for vehicles according to claim 1, wherein the radome (1) also comprises a rear layer (14) including a connector housing (20) that houses an input contact (21) for connecting the heater (15).

10. Radome (1) for vehicles according to claim 1, wherein the radome (1) comprises connecting walls (9) defining a chamber (10).

11. Radome (1) for vehicles according to claim 10, wherein the thermal control (11) is placed in said chamber (10).

12. Radome (1) for vehicles according to claim 10, wherein the connecting walls (9) are placed outside the field of view area (7).

13. Radome (1) for vehicles according to claim 1, wherein the heater (15) comprises conductive heating wires (29), which are positioned adjacent to the thermal control (11).

* * * * *